United States Patent
Tamilarasan et al.

(10) Patent No.: US 10,061,763 B2
(45) Date of Patent: Aug. 28, 2018

(54) DOCUMENT PRESENTATION INTERFACE BASED ON INTELLIGENT MAPPING

(71) Applicant: ACCENTURE GLOBAL SOLUTIONS LIMITED, Dublin (IE)

(72) Inventors: Prakash Tamilarasan, Hosur (IN); Vinu Varghese, Bangalore (IN); Anil Kumar, Bangalore (IN); Saju P. George, Bangalore (IN); Bhanu Teja V, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 15/459,600

(22) Filed: Mar. 15, 2017

(65) Prior Publication Data
US 2017/0286388 A1    Oct. 5, 2017

(30) Foreign Application Priority Data
Apr. 4, 2016   (IN) .............................. 201641011763

(51) Int. Cl.
| G06F 17/22 | (2006.01) |
| G06F 17/24 | (2006.01) |
| G06F 3/0482 | (2013.01) |
| G06T 11/20 | (2006.01) |
| G06F 17/30 | (2006.01) |

(52) U.S. Cl.
CPC .......... *G06F 17/248* (2013.01); *G06F 3/0482* (2013.01); *G06F 17/30554* (2013.01); *G06F 17/30489* (2013.01); *G06T 11/206* (2013.01)

(58) Field of Classification Search
CPC ............. G06F 17/30489; G06F 17/248; G06F 17/30554; G06F 3/0482; G06T 11/206
See application file for complete search history.

(56) References Cited

U.S. PATENT DOCUMENTS

| 6,976,031 | B1 * | 12/2005 | Toupal | G06F 17/248 |
| 7,885,972 | B2 * | 2/2011 | Pragada | G06F 17/30489 707/776 |
| 2007/0265926 | A1 * | 11/2007 | Ohmann | G06Q 30/02 705/14.51 |
| 2011/0307477 | A1 * | 12/2011 | Dasari | G06F 17/30489 707/723 |

* cited by examiner

*Primary Examiner* — Maikhanh Nguyen
(74) *Attorney, Agent, or Firm* — Mannava & Kang, P.C.

(57) ABSTRACT

A document presentation interface generates documents or reports based on automatic mapping of the specified data fields to the columns to be included in the document. The data fields are selected from a plurality of data sources associated with different applications. A template is selected for the generation of the document and one or more of a rules-based processing, a historical lookup or similarity scoring techniques are implemented to automatically map the selected data fields to the columns. The document which is generated from the automatic mapping is transmitted to the users via the modalities specified during the document configuration.

15 Claims, 10 Drawing Sheets

DOCUMENT PRESENTATION INTERFACE BASED ON INTELLIGENT MAPPING

PRIORITY

The present application claims priority under 35 U.S.C. 119(a)-(d) to Indian patent application number 20161011763, having a filing date of Apr. 4, 2016, the disclosure of which is hereby incorporated by reference in its entirety.

BACKGROUND

Documents or reports present information in an organized manner. The reports may include text, images, numeric or alpha-numeric data. The extensive use of computers for data processing has resulted in many institutions going paperless so that the documents are frequently generated for display screens of the computing devices. Documents configured for display on computing devices may also include widgets for interactive content that includes audio/video or animated data. The presentation of information in a document in an organized manner may be achieved through creative use of tables, infographics, images or combinations thereof. Documents or reports can obtain their data from various sources such as flat files, csv (comma separated values) files, spread sheets, databases and the like. Various applications employ report generating tools to collate data from their databases and present it in a coherent manner as reports that help users to analyze and understand complex data. The users may in turn derive actionable insights from the reports. As the capacity of computing platforms is scaled to handle larger datasets or big data and with cloud computing being increasingly relied upon to handle users' needs, reporting servers are expected to process tera bytes of data while supporting users around the globe.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, a document presentation interface and an intelligent reporting tool including a report engine based on automatic mapping are disclosed. A reporting system including the document presentation interface and the intelligent reporting tool, facilitates generating documents or reports from data gathered from a plurality of data sources. The data sources may be associated with multiple unrelated applications located on different data servers and may store data of different data formats. By the way of illustration and not limitation, the data sources can include one or more of flat files, spread sheets, CSV (comma separated value) files, relational databases and the like. A user can specify attributes of a report to be generated. In an example, the user can specify the attributes once to generate multiple reports based on the selected attributes, and modify the selection as needed to change the reports. The user-specified attributes can include but are not limited to a name of the report, the information from the data sources to be included in the report, the periodicity of the report, the modes of delivery, the recipients of the report and the like. When specifying the data sources, the user can select a combination of the data sources from the various unrelated, disparate applications that may include data in different data formats. Processor-executable instructions that form the report engine may receive the user's specifications, access the various data sources included in the report attributes to fetch the data fields, access one of a plurality of templates as specified by the user, map the data fields to columns to be included in the report, generate the report using the automatic mapping and deliver the report per a user-selected delivery mode. The intelligent reporting tool includes various user interfaces, for example, screens in one or more graphical user interfaces to receive the various report attributes from the user and store them to configuration tables, to schedule reports and a monitoring console or dashboard that provides users with status updates pertaining to the various reports.

The report engine can include instructions that provide predictive mapping for the fields from the data sources to the columns to be included in the report. In an example, the data fields to be included in the report may be specified by the user and the columns to be included in the report can be determined from one of the standard templates, a default template or a custom template whichever is selected for the report generation. It can be appreciated that the data fields may be included in the report without changes or the data fields may be transformed by aggregation or combination with other data fields from the same data source or another data source or otherwise processed for inclusion into the report. The report engine may include rules-based processing wherein for particular types of data a predetermined mapping is defined to map particular data fields to specific report columns. The rules-based processing can be employed for particular data types such as image data or data fields that the user desires to map to particular report columns. Also, the reporting system can execute predictive mapping. For example, historical mapping data that includes prior mappings between the data fields and columns to be included in the report can also be accessed to determine if a mapping exists for any of the different data fields specified by the user and the report columns. If it is determined that a mapping exists between one or more data field(s) and one of the report columns in the historical mapping data, then such mapping is obtained from the historical mapping data. If no mapping could be matched from the historical mapping data for the one or more data field(s), the instructions for the predictive mapping determine various similarity measures for automatically mapping the particular data field to one of the report columns. Various methodologies such as but not limited to Levenshtein edit distance method, Jaccard similarity coefficient, Jaro-Winkler distance and longest common sequence can be used to estimate the similarity score for the data field(s) from the historical mapping data. A mapping associated with the best scoring similarity measure is selected for the report generation.

The unique and robust reporting framework provides benefits such as but not limited to, ease of development, monitoring, support and maintenance of jobs, technical compatibility, futuristic design and concepts and scalability. In accordance with traditional report development methodologies, when data had to be fetched from different data sources, separate reporting systems were maintained for each of the data sources. Each reporting system included its own database and report builder which necessitated the user to log into the different reporting systems in order to generate reports containing the data from the different data sources. Moreover, the user was not enabled to generate a report on the fly that aggregates the information from the different data sources. Instead, the user would need to load the data from one data source into another data source, process/clean the data so that it is compatible with the other data source and generate the reports using the reporting engine associated with the other data source. On the other hand, the intelligent reporting tool and reporting system of the present disclosure can receive and generate reports on the fly such that the reports include data from different data sources of the various unrelated applications that may have data in various data formats. The intelligent reporting tool mitigates the need for the various unrelated applications to maintain their own reporting functionalities therefore the user does not need to log into the various reporting systems. Moreover, the predictive mapping in the intelligent reporting tool simplifies the process of developing reports as explicit mappings between the data fields and controls on the report are eliminated. The user may enter the report attributes via a configuration user interface and the intelligent reporting tool uses the predictive mapping to automatically generate the report without the need for the report development process, thereby speeding up the report generation process. The report monitoring interface provides for centralized reporting framework wherein the monitoring dashboard provides user access to the updates throughout the reporting lifecycle. The intelligent reporting tools also provides for backwards compatibility with older versions of the underlying software package and seamless upgrade to newer versions. Moreover, the automatic mapping function of the intelligent reporting tool is designed to be scalable to multiple servers and database sources.

Figure 1:
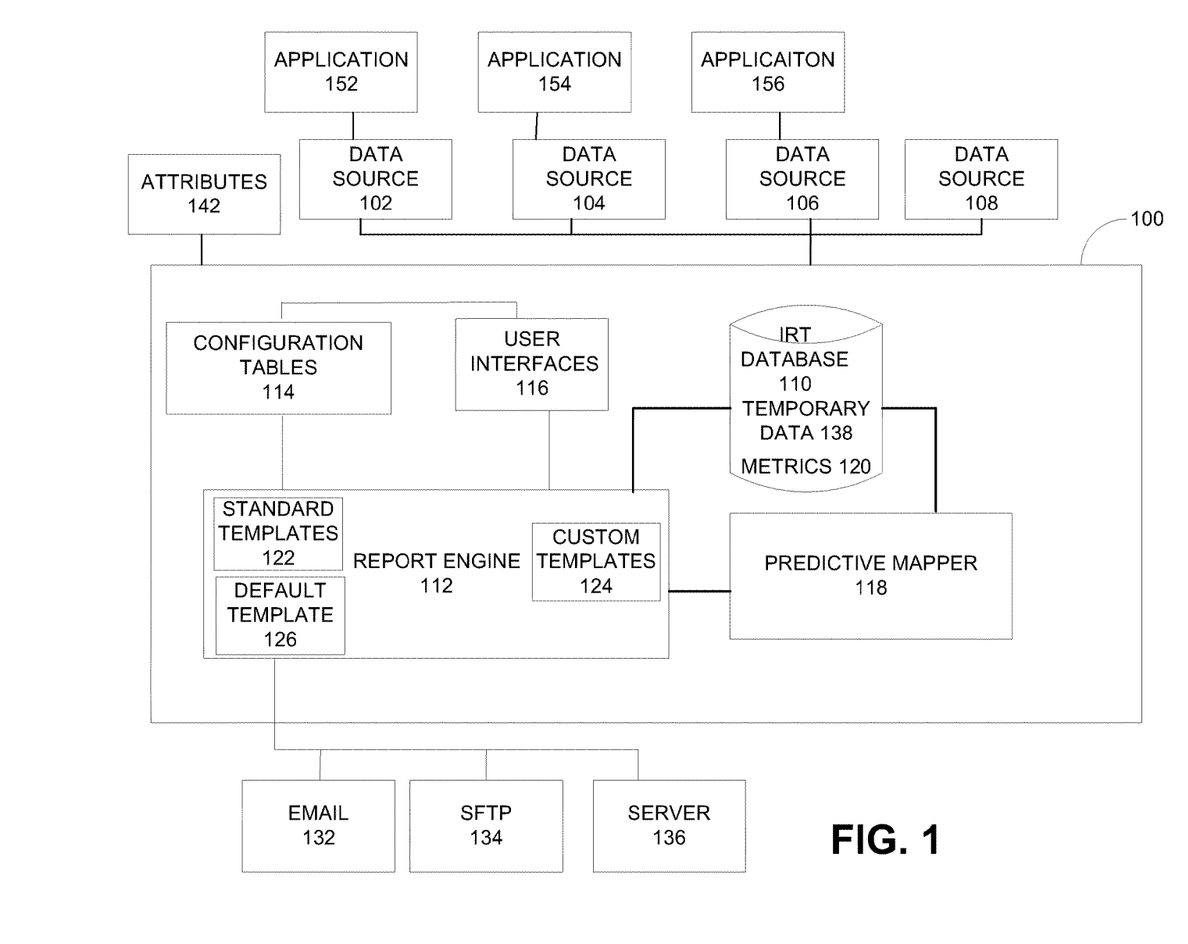
FIG. 1 shows a block diagram of an intelligent reporting tool (IRT).

FIG. 1 shows an intelligent reporting tool (IRT) 100 or a document presentation interface based on intelligent, automatic mapping. The IRT 100 can include a local reporting database, the IRT database 110, in addition to being connected to a plurality of data sources 102, 104, 106 and 108 which are disparate in that the data sources 102, 104 and 106 can be associated with various unrelated applications 152, 154 and 156. An application can include system software or end-user programs that collect, store or process data. By the way of illustration and not limitation, data source 102 may be an RDBMS connected with a human resources application 152 and contain employee information, data source 104 can be a data store that interfaces with sensor application 154 on which raw data from industrial components such as sensors is stored, data source 106 may be connected with an accounting application 156 with information stored in spreadsheets and data source 108 may not be associated with any particular application and instead stores miscellaneous information as comma separated values in text files. The data sources 102, 104, 106 and 108 may be located at one physical location in an example. In another example, the disparate data sources 102, 104, 106 and 108 may be scattered at different physical locations throughout the globe. A user who desires to aggregate information from at least two of the data sources 102, 104, 106 and 108 in a report would normally be required to export the data from one data source to another and use the reporting engine associated with one of the data sources to generate the report. Examples of the IRT 100 disclosed herein enable accessing the data from the variety of data sources 102, 104, 106 and 108 in a uniform manner to generate reports on the fly that aggregate the information from two or more of the data sources.

In one example, IRT 100 can be modules of processor-executable instructions stored in a non-transitory processor-readable medium. A processor executes the various instructions to carry out the tasks as outlined herein. In an example, the data sources 102, 104, 106 and 108 can be external data sources stored on disparate computing machines which may be located proximate to or remotely from the computing machine executing the IRT 100. The IRT 100 can generate reports on the fly using data from one or more of the data sources 102, 104, 106 and 108 or from the IRT database 110. In an example, the IRT database 110 can be an Object Linking and Embedding Database (OLEDB) which is specific to the IRT 100 and provides the Application Programming Interfaces (APIs) using Component Object Model (COM) to uniformly access different data sources. The IRT database 110 may temporarily store data 138 fetched from the data sources 102, 104, 106 and 108 during the report generation process. Upon the completion of the report generation process, the temporary data 138 that was stored in the IRT database 110 may be deleted. The IRT database 110 can therefore be accessed by the various unrelated applications for reports generation. In addition, the IRT database 110 can be configured to store other data such as templates that are used to generate the reports, metrics 120 for the report generation process and the like.

Various user interfaces (UI) 116 are included in the IRT 100 for receiving input from a user and for providing output to the users. The user interfaces can include a configuration user interface that enables users to provide report specifications, a monitoring dashboard that enables the users to monitor the various report generation processes and other graphical screens that allow access to portions of the IRT 100 such as user preferences and the like. The users can specify the various report attributes 142 of the report to be generated such as but not limited to, the name of the report, the periodicity for running the report, the delivery modes of the report, the recipients that should receive the report and the data sources to be used in the report via a configuration UI. The attributes 142 supplied by the users are stored in the configuration tables 114 and later retrieved at the time of report generation. The configuration UI also enables a user to modify attributes of an existing report. In one example, the attributes 142 provided by the user may include user preferences which can be stored in a user profile and used in the report generation processes that are executed for that user.

The IRT 100 includes a report engine 112 that receives the user supplied attributes 142 and fetches the input data from one or more of the data sources 102, 104, 106, 108 or 110. Reports are generated either per the standard templates 122, including a default template 126, predefined within the report engine 112 in some examples. Reports can also be generated with custom templates 124 defined by the user. The templates 122 and 124 provide information regarding the columns to be included in the reports, enable formatting of the columns and provide for other data such as logos, to be included in a report for presentation and readability purposes. During the report generation process, the predictive mapper 118 accesses the input data and automatically maps the data fields in the input data to columns of the report to be generated. The mapping is received by the report engine 112 which generates the report accordingly. The predictive mapper 118 in combination with the templates 122, 124 enables automatic generation of the reports on the fly by eliminating the processes of developing the reports, binding the controls to specific database fields on the report and the like.

The generated reports are delivered to the recipients via the delivery modes specified by the user in the attributes 142. The reports can be delivered as attachments via email 132, or the reports may be uploaded to secure locations such as an SFTP (Secure File Transfer Protocol) server 134 or to a server 136 such as a SharePoint server. When the reports are uploaded to the SFTP or SharePoint server, an email including a link to the storage location of the report may be sent to the recipients. In an example, different recipients of a report can receive the report via different delivery modes.

The reports generated can be one-time reports or periodic reports which are generated at intervals specified in the attributes 142. The user interfaces 116 can also include a report monitoring dashboard that provides users with updates regarding the report generation process. The problems that may arise during the report generation can be detected and addressed early in the process in order to ensure smooth functioning of the IRT 100.

Figure 2:
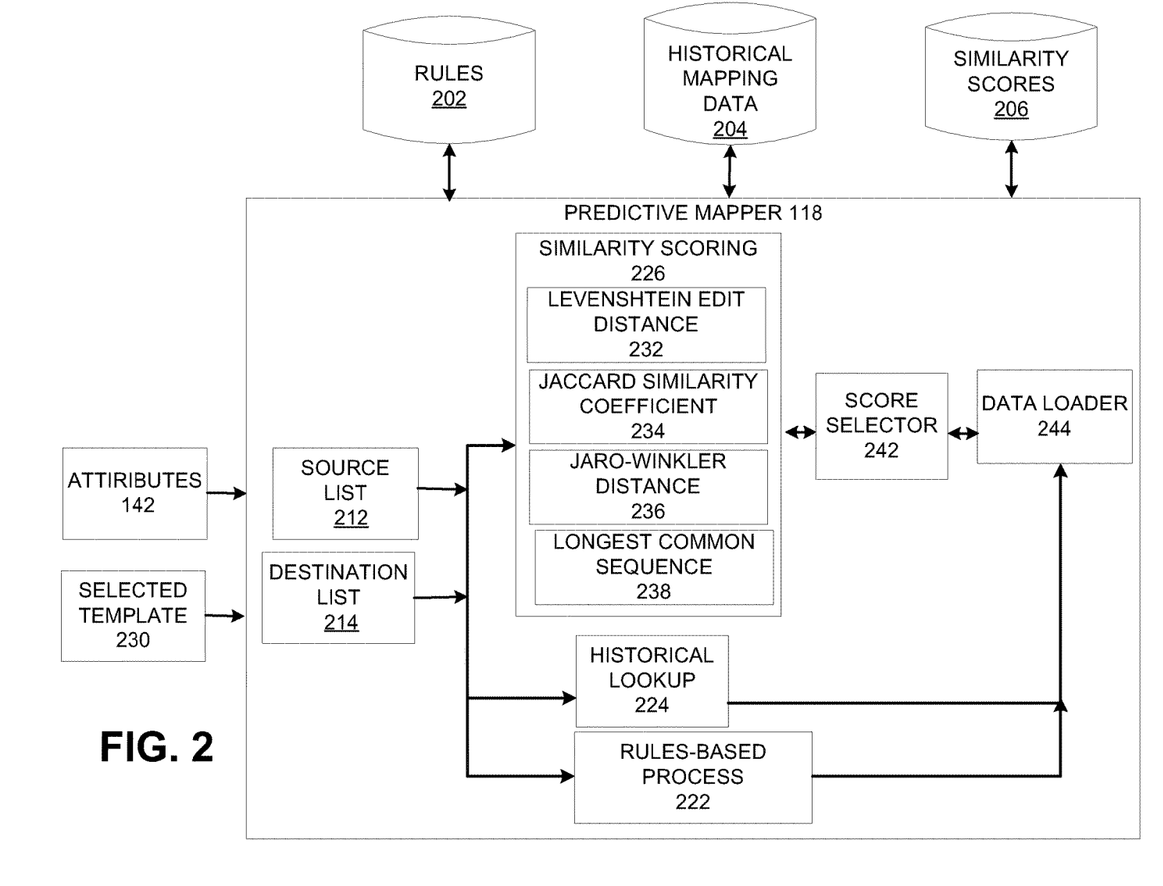
FIG. 2 is a block diagram that illustrates one example of the predictive mapper.

FIG. 2 is a block diagram that illustrates one example of the predictive mapper 118. The predictive mapper 118 generates the source list 212 including the data fields to be selected from one or more of the data sources 102, 104, 106, 108 or 110 and the destination list 214 which is the list of columns to be included in the report. In an example, the source list 212 and the destination list 214 can be generated by the predictive mapper 118 based on the attributes 142 and the selected template 230 which can be one of the standard templates 122, a default template 126 or a custom template 124. For example, a database procedure may be analyzed to identify the data fields to be fetched from the data sources 102, 104, 106, 108 or 110 and the columns to be included in the report. Upon the analysis, it may be determined that the columns in the report map to the data fields fetched from the data sources so that a one-to-one correspondence exists between the data fields in the source list 212 to the columns in the destination list 214. However, this may not be the case for every report. In another example, the columns in the report may include data that is summarized, aggregated or otherwise processed from one or more data fields selected from one or more of the data sources 102, 104, 106, 108 or 110. For example, data for a report column may be obtained by processing information from a data field of the data source 102 and another data field from the data source 106. In this case, the number of data fields in the source list 212 can be different from the number of columns in the destination list 214. The predictive mapper 118 enables automatic mapping of the data fields to their columns within the report based at least on the selected template 230.

The predictive mapper 118 can employ one or more of a rules-based process 222, a historical lookup process 224 or a similarity scoring technique 226 for automatically mapping the data fields in the source list 212 to the report columns in the destination list 214. The instructions for executing the automatic mapping may initially determine if a rules-based process 222 is activated for the data field(s). Rules-based process 222 can be applied when users desire specific data field-column mappings. For example, particular applications may require mapping certain data fields to particular report columns. In another example, users may define specific mappings or rules for certain data-fields/column combinations based on particular requirements of the reports. Such explicit mappings or defined rules can be stored as rules 202 within a data store accessible to the IRT 100 such as the IRT database 110. Rules-based process 222 may also be applied to data fields that cannot be handled efficiently by automated Artificial Intelligence (AI) techniques, such as, the large data sets associated with images. Instead, one of the rules 202 can provide an explicit mapping of such data fields to the corresponding report columns.

If a rules-based process 222 is not defined for a data field-column mapping, instructions corresponding to the historical lookup process 224 may be executed wherein a historical mapping database 204 is employed to identify if any mappings were previously made from the data fields in the source list 212 to the columns in the destination list 214. The historical mapping database 204 stores historical lookup data that includes successful data fields-column mappings that were previously identified through one or more of the rules-based process 222, the historical lookup process 224 or the similarity scoring technique 226. As the IRT 100 is employed over time, there will be a corresponding increase in the successful mappings stored in the historical mapping database 204. As a large number of reports are generated and used during the routine workings of an organization, the volume of data in the historical mapping database 204 increases quickly over a short time period. If any mappings that match particular data field/column combinations are identified in the historical mapping database 204, then such mappings are used to map the data fields in the source list 212 to the columns in the destination list 214.

If no rules are defined and no historical mappings are identified for any one of the data fields, then instructions related to similarity scoring 226 are executed in order to determine a mapping for that data field. Therefore, within a single report there can be a subset of the data fields in the source list 212 whose mapping is identified from using the rules-based processing 222 or the historical lookup process 224 and another subset of data fields in the source list 212 which requires a determination of similarity scores for their mappings. When a data field is to be mapped using the similarity scoring 226, various similarity scores for the historical mapping data 204 for that data field are estimated. The similarity scores may include scores generated using functions such as but not limited to, Levenshtein edit distance 232, Jaccard similarity coefficient 234, Jaro-Winkler distance 236 and Longest common sequence 238. By the way of illustration and not limitation, the similarity scores returned by one of the functions can range between zero (0) and one (1), where a score of zero may indicate that there is no match while a score of one can indicate an exact match and an intermediate value such as 0.8 can convey an 80% match between the data being compared.

As mentioned herein, the report generated may include different types of data such as but not limited to numbers, text, alphanumerical data, images, audio, video data and the like. The similarity scores may estimate the extent of mapping based on various factors such as but not limited to, the names of the data fields, the names of the columns, the type of data in a data field, the type of data expected or permitted by the constraints on a column and the like. A simple mapping may involve mapping data fields from an employee data source to columns of the selected template 230 which may be from one of the standardized templates 122. The selected template 230 may be standardized to receive employee data. However, more complex mappings can involve data fields that are to be mapped to, for example, columns from the default template 126 whose expected data types or constraints do not map exactly to the data fields. In such cases, different similarity scores may be used for different data fields.

In one example, the Levenshtein edit distance 232 may present the best similarity score for data fields having string data type as the Levenshtein edit distance 232 can be obtained by finding a cheapest way to transform one string into another string. By the way of illustration and not limitation, the strings used may include one or more of the names of the data fields received from the data sources and the column names and the data field values and the domain of values permitted into the column based on the column constraints. Jaccard similarity coefficient 234 measures similarity between finite sets and is defined as the size of the intersection of the sample sets divided by the size of the union of the sample sets. In an example, the Jaccard similarity coefficient for a data field and a column can be measured on two sample sets that comprise the data field values and the domain of values permitted into a column. Generally the Jaccard similarity coefficient can be applied for binary attributes. Jaro-Winkler distance 236, in accordance with one application, measures the similarity between two strings. It can be applied to short strings such as names of people or companies and the like. Again, the strings used to measure the Jaro-Winkler distance may include one or more of the names of the data fields received from the data sources and the column names and the data field values and the domain of values permitted into the column based on the column constraints. One application of the longest common sequence (LCS) 238 enables finding the longest common subsequence between two sequences. The sequences may include string or numerical sequences. As different functions can be optimally applied to different data types, different data fields in a report which are mapped using the similarity scoring 226, may be mapped using two different functions.

The score selector 242 compares the various similarity scores estimated from the different functions and selects a mapping associated with the best similarity score for use in the report. The best similarity score is obtained based on the nature of the selected function. For example, when using Jaro-Winkler distance 236, a lower string distance is indicative of greater similarity between the strings. On the contrary, when using Levenshtein edit distance 232, higher distance indicates greater string matching. Different similarity scores may thus have different values and different criteria indicative of similarities between quantities being compared. The similarity scores from various techniques for each column are generally normalized and a similarity score which indicates a best match or a high level of matching between the data field(s) and the column is selected as the best similarity score. In an example, a high value of the similarity score on the normalized scale may indicate a good match and accordingly, the mapping associated with the highest similarity score among the various similarity scores may be selected. Two examples of similarity score evaluation and selection are shown below for better illustrating the function of the score selector 242 within the predictive mapper 118. It can be appreciated that the data and the scores shown below are included for illustration purposes only and are not limiting. Other values and scoring techniques can be implemented in accordance with the examples described herein. The source input indicates a value being provided by a data source within the source list 212 while the destination input is indicative of the value in the destination list 214 to which the source input is to be matched.

EXAMPLE 1

The first example involves evaluation of two strings for which the best similarity score was provided by the Jaro-Winkler distance 236 function.

| Source Input | Destination Input | Data Type | Best Similarity Score |
|---|---|---|---|
| Tamilarasan | Tamilarasu | String | 90% (Jaro-Winkler) |

Sample similarity scores:
Levenshtein distance: 0.65
Jaccard similarity coefficient: 0.5
Jaro-Winkler distance: 0.1 (flip-flops—90% matching)
Longest common sequence (LCS): 0.84

EXAMPLE 2

The second example involves a quantity 'Employee count' of integer type. The best similarity score for this quantity was provided by the longest common sequence (LCS) 238 function.

| Source Input | Destination Input | Data Type | Best Similarity Score |
|---|---|---|---|
| Employee_Count | Emp_Count | Integer | 84% (LCS) |

Sample similarity scores:
Levenshtein distance: 0.4
Jaccard similarity coefficient: 0.4
Jaro-Winkler distance: 0.6
Longest common sequence (LCS): 0.84

The selected mapping and its respective similarity score can be stored in a database of similarity scores 206. A learning component is thus built into the predictive mapper 118 so that as new data fields, their mappings and their best similarity scores are determined with time, they are stored and reused for historical lookups and similarity scoring by the IRT 100. In an example, the historical mapping data 204 and the similarity scores 206 can be used for explicit training of classifiers so that the data fields-column mapping can be automated by employing the trained classifiers. The report engine 112 receives the mapping and incorporates it in to a selected template 230, in order to generate the report. The selected mappings from one or more of the rules-based processing 222, the historical lookup 224 or the similarity scoring 226 are loaded by the data loader 244 for use in the report. While, the rules 202, historical mapping data 204 and the similarity scores 206 are shown as being stored on different data stores, it can be appreciated that they may be also be stored in the IRT database 110 in some implementations of the IRT 100.

Figure 3:
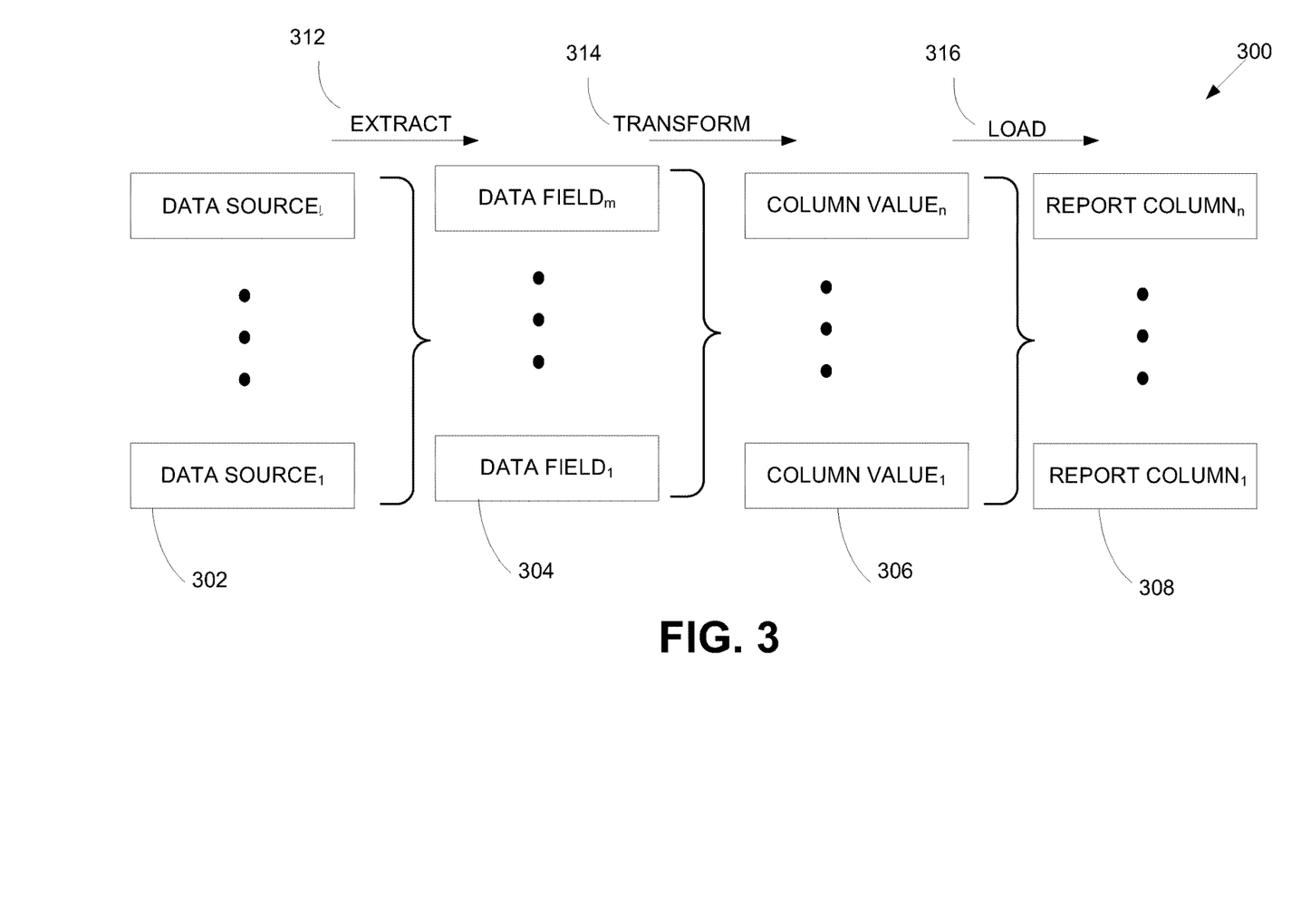
FIG. 3 is a schematic diagram that shows the mapping functions of the predictive mapper.

FIG. 3 is a schematic diagram 300 that shows the mapping functions executed by the predictive mapper 118 in conjunction with the IRT database 110 during the extraction, transformation and loading stages. The IRT database 110 may include an OLE DB interface the enables uniform access to various types of data sources 302. The IRT database 110 can be used to temporarily store the data during the report generation process as the data is being processed and prepared for the reports. During the extraction stage, the predictive mapper 118 accesses a plurality of disparate data sources 302 to extract 312 or fetch the requisite data fields 304 specified in the report attributes 142 to build the report. One or more data fields 304 may be extracted from each of the disparate data sources 302. The predictive mapper 118 also accesses one of the templates 122 or 124 selected by the user or a default template 126, to obtain a list of columns 308 to be included in the report. The data fields 304 thus obtained are transformed 314 into column values 306 to populate the report columns 308 based for example, on the selected template 230. While a subset of the data fields 304 may map directly to the column values 306, another subset of the data fields 304 from one or more of the data sources 302 may need to be processed prior to being transformed into the column values 306. The column values 306 thus obtained are loaded 316 into the report columns 308. As a large number of reports of varying frequencies can be processed and generated during a typical work cycle at an organization, artificial intelligence (AI) techniques mentioned herein can be adopted to functionally match the data fields 304 from the disparate data sources 302 to the columns 308 from the selected template. One or more of the rules-based process 222, historical lookup 224 or similarity scoring 226 can be employed by the predictive mapper 118 to map the data fields 304 to the report columns 308. The examples disclosed herein are thus enabled to generate reports on-the-fly by pulling data from the disparate data sources 302 without requiring each data source to have its own reporting application.

Figure 4:
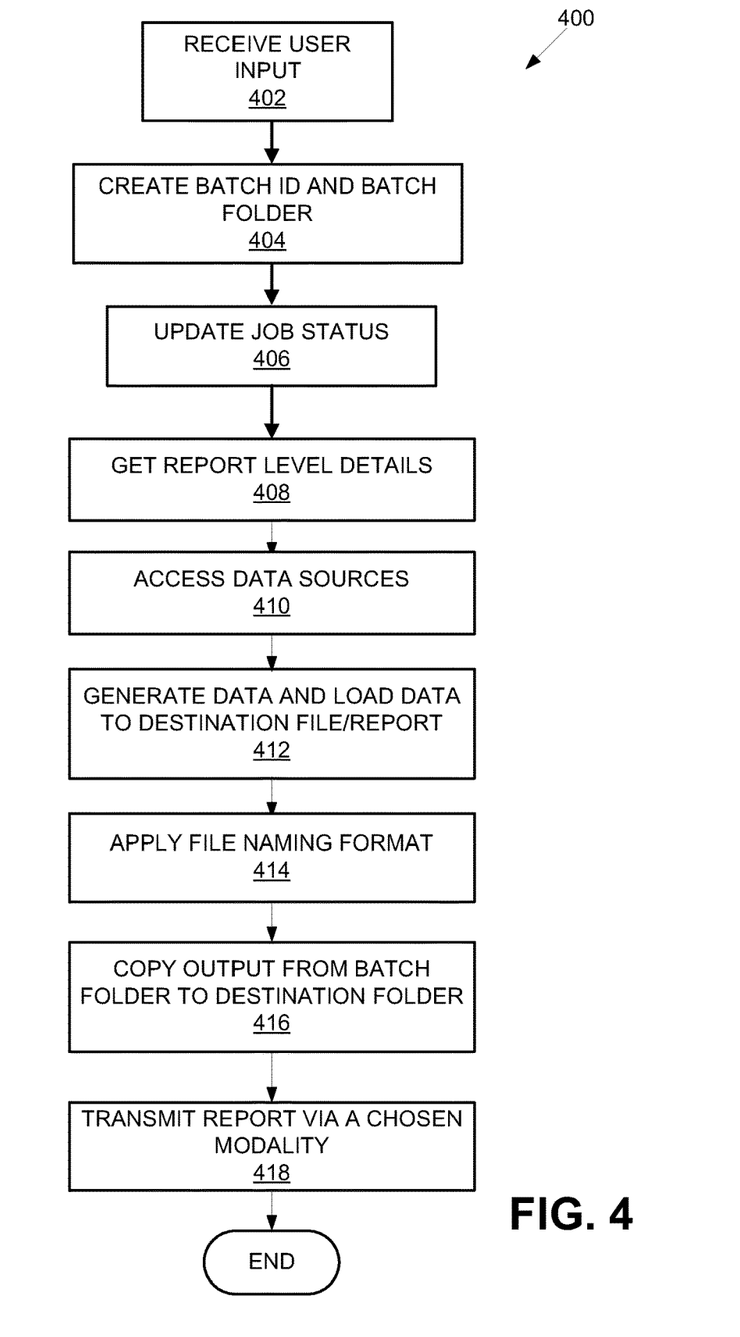
FIG. 4 is a flowchart that details an example method of generating reports by the IRT.

FIG. 4 is a flowchart 400 that details an example method of generating reports by the IRT 100. The method begins at step 402 wherein the user input for generating a report is received. In an example, the user input can include report attributes that are received via a configuration user interface. The configuration user interface is one of the many user interfaces 116 exposed by the IRT 100. Entry of the report attributes into the configuration user interface can be a one-time process as the received attributes may be stored in configuration tables and reused whenever the report is run. At step 404, a batch ID and a batch folder is created for the particular report instance. For example, a plurality of users may be running the same report. In this case, each report instance is uniquely identified by the respective Batch ID and the processing of data during the report generation occurs in a batch folder that may be temporarily created on a user's computer that requested the report or a server running the IRT 100.

At step 406, the job status is updated in the report monitoring dashboard to indicate that the report generation process has commenced. The report monitoring dashboard is one of the User Interfaces 116 included in the IRT 100 which provides the status verification and other details for various reporting tasks being executed by the IRT 100. Details regarding the report monitoring dashboard will be described further infra. At step 408, the report level details are obtained. For example, the data sources to be used, the particular data fields that are to be fetched from the data sources, the columns and values to be populated in the columns in the report or destination file, the template to be used, and the like can be obtained at step 408. The various instances of the reports may be customized for respective users based for example, on the user preferences which can be stored in a user profile on the IRT database 110 or other database communicatively coupled to the IRT 100. At step 410, the data sources specified in the user input are accessed. The data sources can include data of different data formats and may be located on different servers. At step 412, the data for the report is generated using the mapping identified via one or more of the rules-based processing 222, the historical lookup 224 or similarity score determination 226 as detailed herein. The generated data is loaded into the destination file or the report which is named in accordance with the naming format at step 414. The naming format can be determined by the user inputting the report attributes in one example. In another example, the naming format can be automatically set for a given user account. The final report including the named destination file is saved in the batch folder created at step 404. At step 416, the report is copied from the batch folder to a destination folder. The destination folder can be a folder on the IRT database 110 or a folder in a SFTP server or a SharePoint server provided by the user in the configuration screen. At step 418, the report is shared with the recipients via various delivery modes as specified in the attributes 142. For example, the recipients may receive the report as an email attachment. In another example, the recipients may receive a link to the report stored on a remote server. In the examples, wherein the IRT database 110 is used to temporarily save the reports during processing, the report may be deleted from the IRT database 110 upon transmission to the various destinations.

Figure 5:
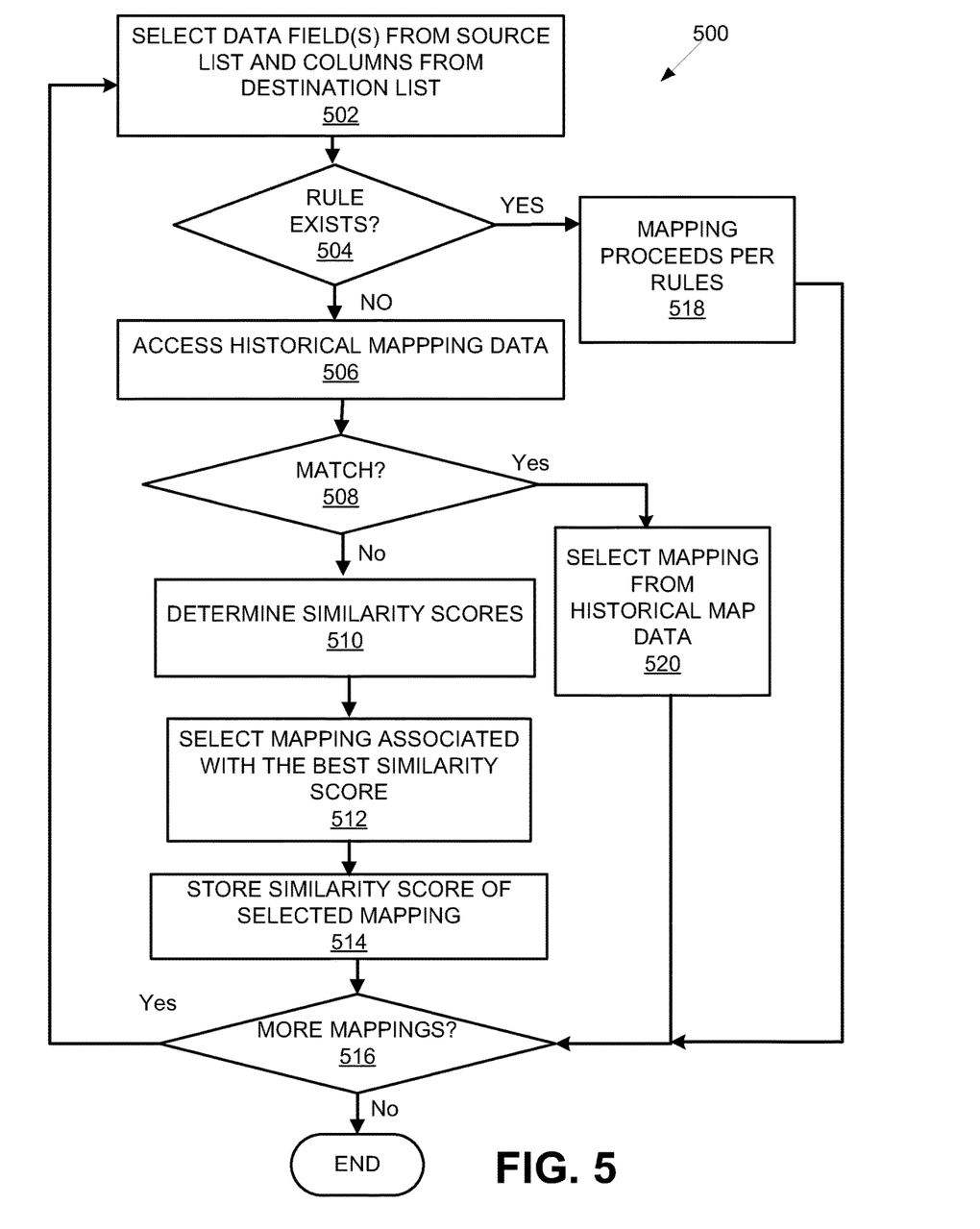
FIG. 5 is a flowchart that details an example method of predictive mapping.

FIG. 5 is a flowchart 500 that details an example method of predictive mapping. The flowchart 500 shows the mapping process as occurring serially only for illustrative purposes. It can be appreciated that the mapping can be done in parallel for the entries in the source list 212 and destination list 214. The method begins at step 502 wherein one or more data fields are selected from the source list 212 and the columns they are to be mapped to are selected from the destination list 214. As mentioned above, a one-to-one or many-to-one mapping can exist from the data fields in the source list 212 to the corresponding columns in the destination list 214. At step 504, it is determined if a rule exists for a selected data field. The determination regarding the rules can be made by accessing the rules 202 which may be stored on the IRT database 110 or another data store which can be accessible to the IRT 100. If it is determined at step 504 that a rule exists for the mapping, the mapping between the data field and the column proceeds per the rules as shown at step 518. The method then proceeds to step 516 to determine if more data fields requiring further mappings need to be processed. If further mappings need to be processed, the method returns to 502 to select the next data field(s) for mapping to one of the columns. If it is determined at step 516 that no further mappings are to be processed, the method terminates on the end block.

If it is determined at step 504 that no rules are defined for the selected data field, the method moves to step 506 to access the historical mapping data 204 in order to identify a mapping for the selected data field to one of the columns. It is determined at step 508 if a match exists in the historical mapping data 204 for the mapping between the selected data field and one of the columns. If it is determined at step 508 that a match between the selected data field and one of the columns exists in the historical mapping data 204, then the mapping is selected from the historical mapping data 204 at step 520. At step 516 it is determined if further mappings need to be identified. If it is determined at step 516 that further mappings need to be identified, the method returns to step 502 to select the next data field(s) to be mapped. If it is determined at step 516 that no further mappings are required, the method terminates on the end block.

If at step 508, it is determined that no match exists in the historical mapping data 204, the method proceeds to determine a plurality of similarity scores at step 510 for the historical mapping data 204 in order to identify a most optimal match. Methodologies for determining the similarity scores can include functions such as but are not limited to Levenshtein edit distance 232, Jaccard similarity coefficient 234, Jaro-Winkler distance 236 and Longest common sequence 238. It can be appreciated that any methodology for determining a similarity score that is currently known or to be invented can be used in accordance with some examples. At step 512, a mapping associated with the highest similarity score is selected as the most optimal mapping for the data field to be used for generating the report. The similarity score of the selected mapping is stored in a similarity score database at step 514 and it is determined at step 516 if further mappings need to be processed. If yes, the method returns to select the next data field(s) to map at step 502 else it terminates on the end block.

Figure 6:
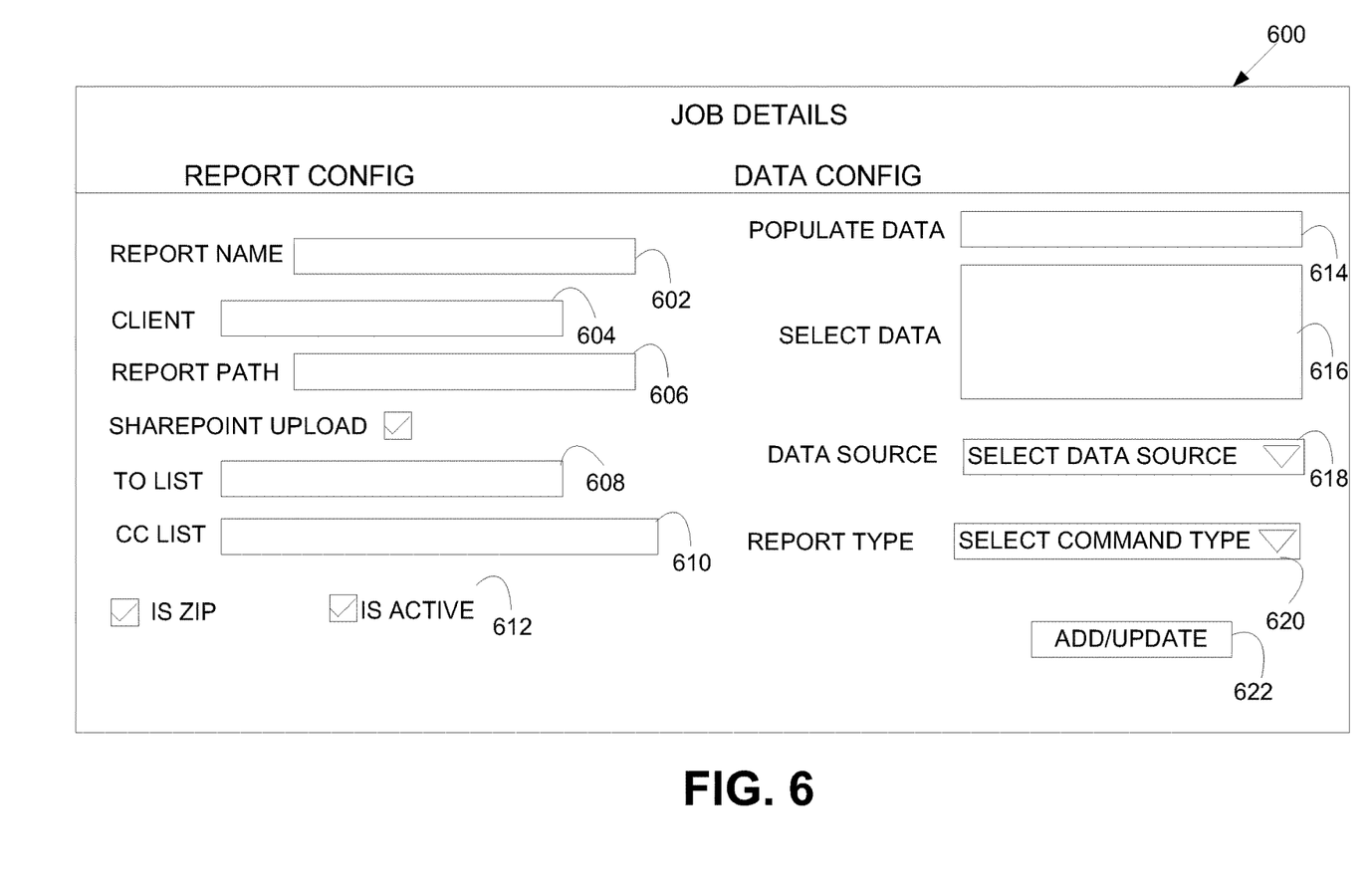
FIG. 6 shows a screen shot of a configuration user interface.

FIG. 6 is an example configuration user interface (UI) 600 that enables users to enter the attributes 142 of a report to be generated. The configuration user interface 600 includes elements for the user to enter a report name 602, a client associated with the report 604, a report path where the report should be stored 606, a check box providing binary input regarding a SharePoint upload that provides a selection regarding a mode of delivery, a 'to' list 608, a copy 'cc' list 610, one or more check boxes for receiving inputs such as whether the report should be zipped and whether the report is active 612, populate data entry box 614, select data box 616, data source drop down box 618 and a report type 620. An add/update button 622 enables the user to add multiple data sources for a report or update attributes of an existing report. When the user indicates that values required for the report generation process have been provided through the configuration user interface 600 via clicking the add/update button 622, the report generation process can be commenced. The statement included in the select data box 616 can be executed against the corresponding data source(s) identified in the data source box in order to build the report. As the IRT database 110 provides uniform access to various data sources, the various data sources 302 can be easily accessed through the data source drop down box 618. In an example, the values entered through the configuration UI 600 can be stored in configuration tables for future use such as for reports that are periodically generated.

Figure 7:
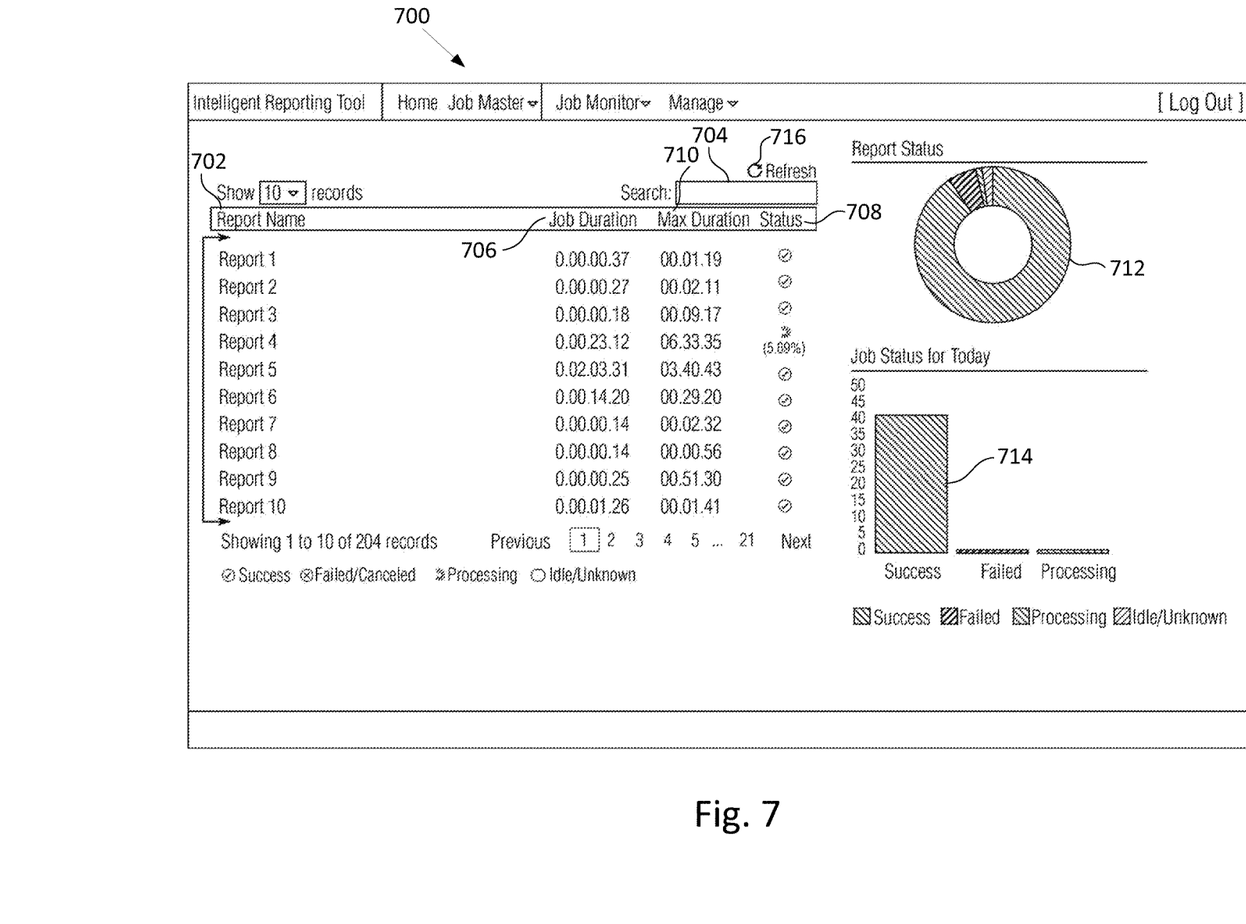
FIG. 7 shows an example of the monitoring console or dashboard.

FIG. 7 shows an example of the monitoring console or dashboard 700 which provides status updates to the users regarding the various reports within the IRT 100. In an example, the IRT 100 can include a metrics database 120 that stores data regarding the various reports and the monitoring dashboard 700 pulls data from the metrics database 120 for the status updates. The monitoring dashboard 700 includes a list of reports 702 with selectable entries. The list entries 702 can be programmed so that selecting an entry can lead to the execution of a report, or to display of a further detailed screen regarding the status of the report or other information regarding the selected report. A search box 704 enables users to search for particular reports, for example, using a report name. The duration to execute a job 706 of generating a report, the maximum duration for that job 710 and the status 708 of the job are provided to the user by the dashboard 700. In addition to the textual data, various infographics are included in the dashboard 700 for providing the updates to the user. For example, a pie chart 712 provides the status of a particular report. Different colors can be used in the pie chart 712 to convey the number of times the report was successfully executed, the number of times that the report had errors and the number of times when the report execution failed. The bar diagram 714 provides another way of conveying the statistics regarding the successes, failures and works in progress of the various jobs executed during that day. A refresh control 716 enables refreshing the dashboard 700 so that the latest statuses of the various reports are presented to the user.

Figure 8:
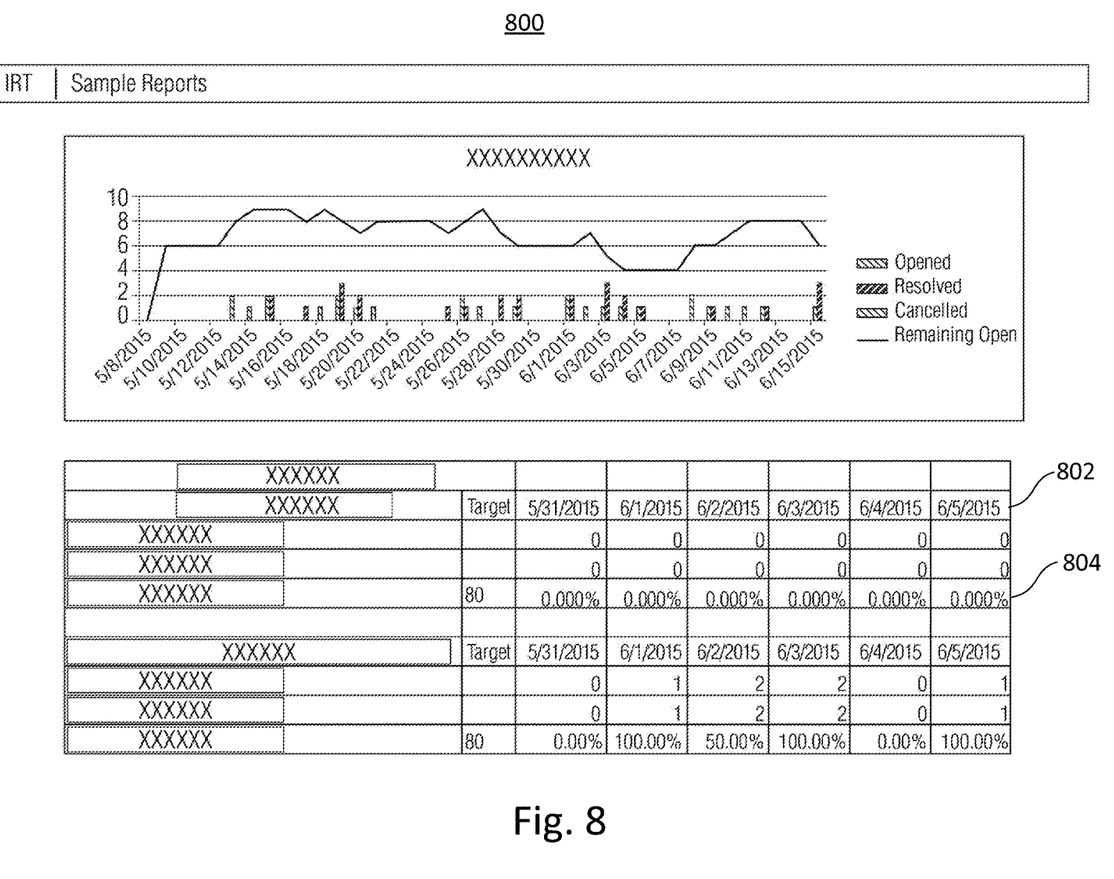
FIG. 8 shows a sample report generated by the IRT in accordance with the methodologies described herein.

FIG. 8 show a sample report 800 generated by the IRT 100 in accordance with the methodologies described herein. The sample report is generated by the predictive mapper 118 that maps the data fields to columns using one of the standard templates 122 or default template 126, or the custom templates 124. The values 802, 804 shown in the various columns of the sample report may have been either mapped directly from the database fields or may be values obtained by transforming the values from one or more of the data fields 304 which were extracted from one or more of the disparate data sources 302. The sample report 800 can be delivered to the users as an email attachment or it may be loaded to one of the servers and the recipients are notified of the location at which they may access the sample report 800.

Figure 9:
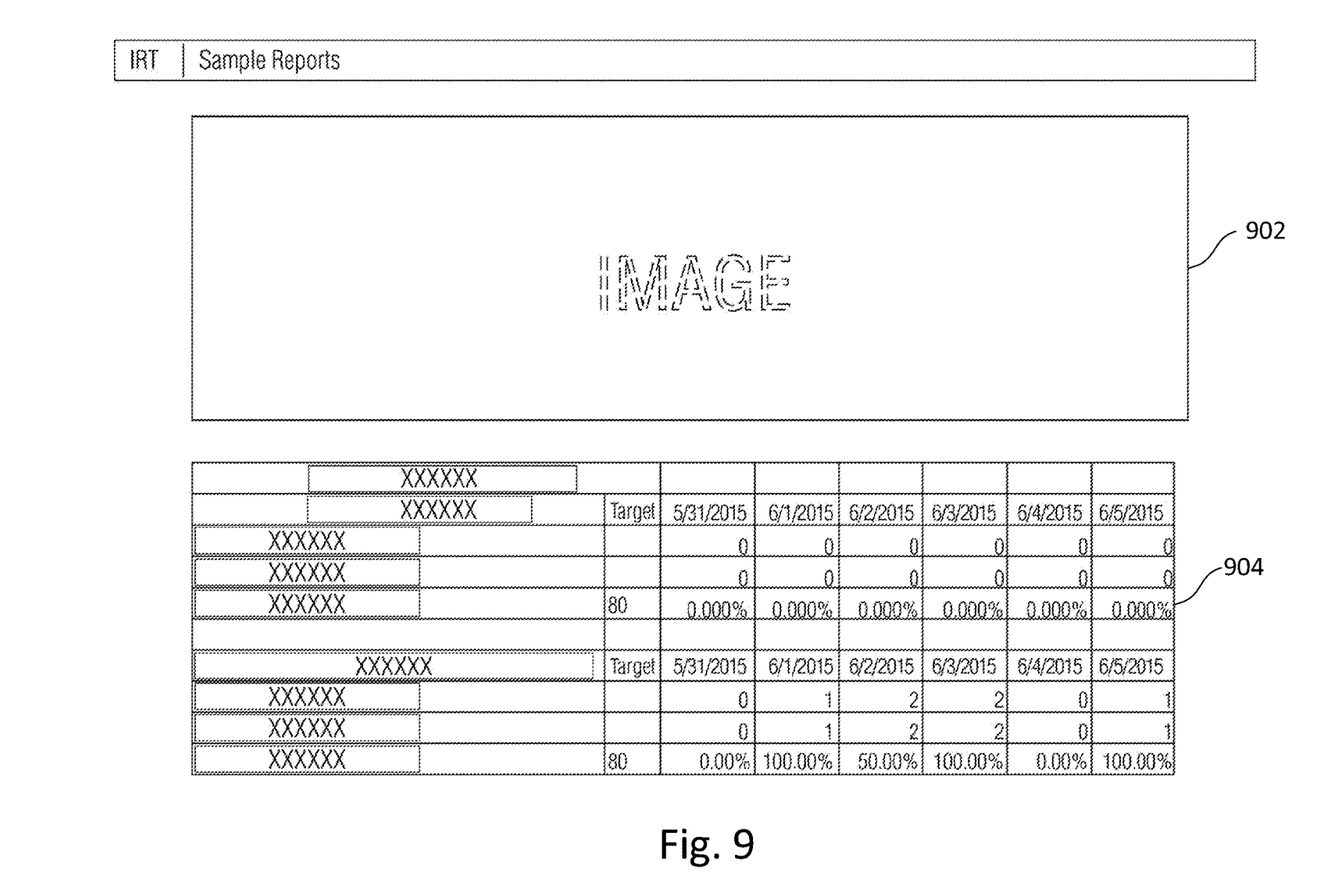
FIG. 9 shows another sample report generated by the IRT in accordance with the methodologies described herein.

FIG. 9 show another sample report 900 generated by the IRT 100 in accordance with the methodologies described herein. The sample report 900 is generated by the predictive mapper 118 using the rules based processing 222 as the sample report 900 includes an image 902 and data 904 retrieved from one or more of the data sources 102, 104, 106 and 108. The predictive mapper 118 is configured with specific mapping routines that are executed whenever image data is encoded. Similarly other kinds of data may be mapped by specific routines when routines within the IRT 100 do not handle the mapping tasks efficiently. Different data types such as text, images, or even audio, video data from various data sources 302 may be mapped to report columns using the automatic mapping techniques disclosed herein for generating reports on the fly without extensive programming.

Figure 10:
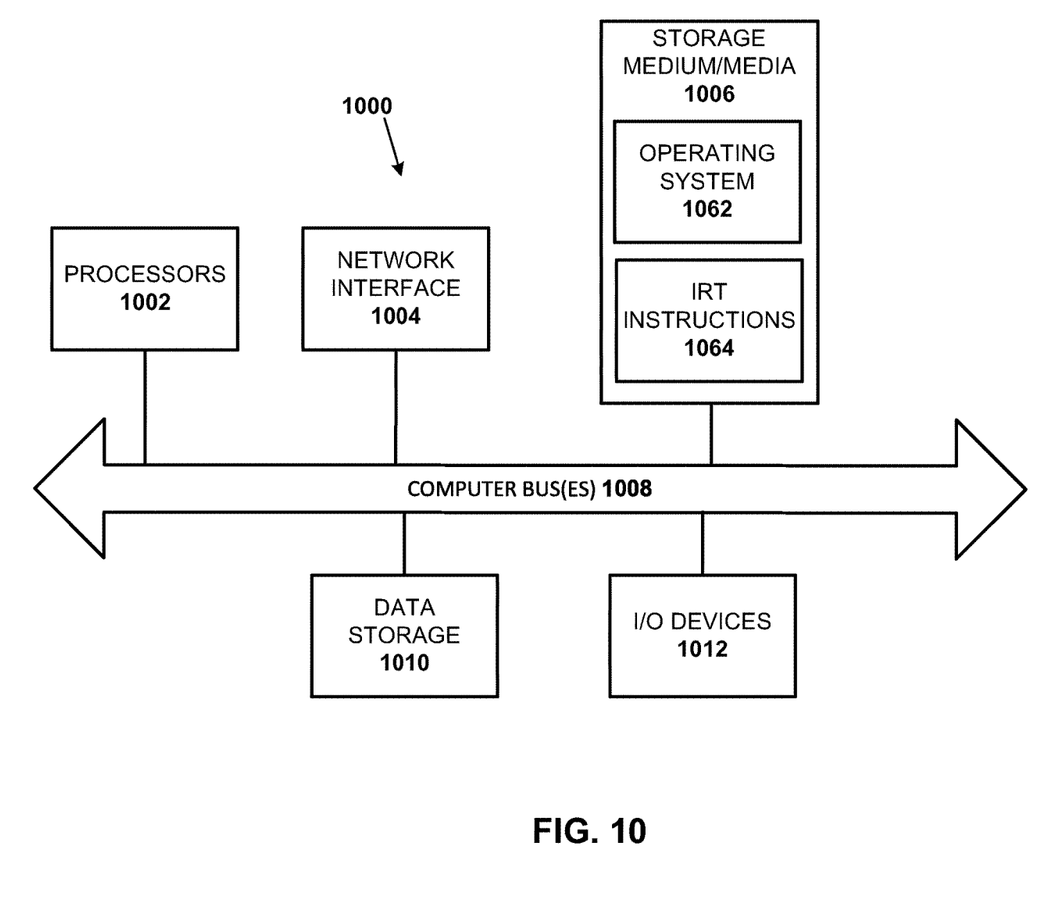
FIG. 10 illustrates a computer system that may be used to implement the IRT.

FIG. 10 illustrates a computer system 1000 that may be used to implement the IRT 100. More particularly, computing machines such as desktops, laptops, smartphones, tablets, wearables which may be used to generate or access the reports may have the structure of the computer system 1000. The computer system 1000 may include additional components not shown and that some of the components described may be removed and/or modified.

The computer system 1000 includes processor(s) 1002, such as a central processing unit, ASIC or other type of processing circuit, input/output devices 1012, such as a display, mouse keyboard, etc., a network interface 1004, such as a Local Area Network (LAN), a wireless 1002.11x LAN, a 3G or 4G mobile WAN or a WiMax WAN, and a computer-readable medium 1006. Each of these components may be operatively coupled to a bus 1008. The computer readable medium 1006 may be any suitable medium which participates in providing instructions to the processor(s) 1002 for execution. For example, the computer readable medium 1006 may be non-transitory or non-volatile medium, such as a magnetic disk or solid-state non-volatile memory or volatile medium such as RAM. The instructions or modules stored on the computer readable medium 1006 may include machine readable instructions 1064 executed by the processor(s) 1002 to perform the methods and functions of the IRT 100.

The IRT 100 may be implemented as software stored on a non-transitory computer readable medium and executed by one or more processors. For example, the computer readable medium 1006 may store an operating system 1062, such as MAC OS, MS WINDOWS, UNIX, or LINUX, and code 1064 for the IRT 100. The operating system 1062 may be multi-user, multiprocessing, multitasking, multithreading, real-time and the like. For example, during runtime, the operating system 1062 is running and the code for the IRT 100 is executed by the processor(s) 1002.

The computer system 1000 may include a data storage 1010, which may include non-volatile data storage. The data storage 1010 stores any data used by the IRT 100. The data storage 1010 may be used to store real-time data from the report generation processes to provide updates or store historical data such as similarity scores generated by the IRT 100.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A document presentation interface, comprising:
   one or more processors; and
   a non-transitory data storage comprising instructions that cause the processors to:
   receive user input specifying attributes for a report to be generated, the attributes comprise a plurality of data sources that comprise data of different data formats for generating the report, each of the plurality of data sources is associated with a respective application;
   fetch a plurality of data fields from the plurality of data sources wherein the plurality of data fields are determined from the attributes;
   generate a source list comprising the plurality of data fields from the data sources to be used in the report;
   select one of a standard template, a default template or a custom template to be used for the report;
   determine columns to be included in the report based at least on the selected template, and at least one of the columns comprising values aggregated from at least two of the plurality of data fields;
   generate a destination list comprising the columns to be included in the report;
   automatically map a subset of the plurality of data fields from the source list having defined rules to the columns of the report in the destination list by rules-based processing, and
   automatically map a subset of the plurality of data fields from the source list that do not have the defined rules to the columns of the report in the destination list using one or more of a historical lookup processing and similarity scoring, wherein the automatic mapping for the subset of data fields that do not have the defined rules causes the processor to:
   access historical mapping data comprising prior mappings of the plurality of data fields to the columns;
   determine if a match from the prior mappings exists in the historical mapping data for at least one data field of the subset data fields that do not have the defined rules to be included in the report; and
   use a mapping from the historical mapping data for the at least one data field if the match exists;
   for each of the data fields from the subset data fields that do not have the defined rules and wherein no match exists in the historical mapping data,
   estimate a plurality of similarity scores for the prior mappings in the historical mapping data;
   select a mapping from the historical mapping data corresponding to a highest similarity score from the plurality of similarity scores to be used for each of the data fields;
   generate the report by using one or more of the automatic mappings and the selected template; and
   transmit the report to user-selected recipients via a delivery mode specified in the attributes.

2. The document presentation interface of claim 1, wherein the plurality of data sources comprise flat files, comma separated values (CSV) files and relational databases.

3. The document presentation interface of claim 1, further comprising instructions that cause the processors to:
   upload metrics regarding the generation of the report to a metrics database; and
   provide updates for the generation of the report via display of information from the metrics database on a monitoring dashboard.

4. The document presentation interface of claim 1, wherein the delivery mode comprises one of an email and a server upload.

5. The document presentation interface of claim 1, further comprising instructions that cause the processors to:
   provide a configuration user interface to the user, the configuration user interface is enabled to receive the attributes.

6. The document presentation interface of claim 5, further comprising instructions that cause the processors to:
   store the attributes entered by the user in configuration tables.

7. A method of generating a report comprising:
   receiving user input for a report to be generated;
   retrieving attributes for the report from the user input, the attributes comprising a plurality of disparate data sources that include data of different data formats, each of the plurality of disparate data sources is associated with a respective application;
   fetching a plurality of data fields from the plurality of disparate data sources wherein the plurality of data fields are determined from the attributes;
   generating a source list comprising the plurality of data fields from the plurality of disparate data sources to be used in the report;

selecting a template for generating the report, the template being selected from a plurality of report templates that comprise a standard template, a default template and a custom template;

determining column values and columns to be included in the report based at least on the selected template, at least one of the columns comprising values aggregated from at least two of the plurality of data fields;

generating a destination list comprising the columns to be included in the report;

storing temporarily in a reporting database, data fields from the plurality of disparate data sources for generating the report;

automatically mapping a subset of the plurality of data fields from the source list having defined rules to the columns of the report in the destination list by rules based processing;

automatically mapping a subset of the plurality of data fields from the source list that do not have the defined rules to the columns of the report in the destination list using one or more of a historical lookup processing and similarity scoring, wherein the automatic mapping for the subset of data fields that do not have the defined rules further comprises:

accessing historical mapping data comprising prior mappings of the plurality of data fields to the columns;

determining if a match from the prior mappings exists in the historical mapping data for at least one data field of the subset data fields that do not have the defined rules to be included in the report; and using a mapping from the historical mapping data for the at least one data field if the match exists; and, for each of the data fields from the subset data fields that do not have the defined rules and wherein no match exists in the historical mapping data, estimating a plurality of similarity scores for the prior mappings in the historical mapping data;

selecting a mapping from the historical mapping data corresponding to a highest similarity score from the plurality of similarity scores to be used for each of the data fields;

generating the report based on one or more of the automatic mappings of the data fields to the columns;

transmitting the report to at least one recipient via a delivery mode specified in the attributes; and deleting the data fields from the reporting database upon the transmission of the report to the at least one recipient.

8. The method of claim 7, wherein retrieving the attributes further comprises: retrieving the attributes which were supplied by a user from configuration tables.

9. The method of claim 7, wherein selecting a template further comprises:

determining if a user specified one of the standard template or the custom template for the report; and automatically selecting the default template if the user did not specify either the standard template or the custom template for the report.

10. The method of claim 7, wherein assessing the similarity scores further comprises:

assessing a plurality of similarity scores for each data field-column mapping using Levenshtein edit distance method, Jaccard similarity coefficient, Jaro-Winkler distance and longest common sequence.

11. The method of claim 7, further comprising:
determining that a data type of the data field to be mapped is an image data type; and automatically mapping the data field through the rules-based processing.

12. A non-transitory computer readable storage medium comprising instructions that cause a processor to:

retrieve per user input, attributes for a document to be generated, the attributes comprise a plurality of data sources, each of the plurality of data sources is associated with a respective application and the plurality of data sources comprise data of different data formats;

fetch a plurality of data fields from the plurality of data sources in accordance with the user input wherein the plurality of data fields are determined from the attributes;

generate a source list comprising the plurality of data fields from the data sources to be used in the document;

select one of a standard template, a default template or custom template to be used for the document generation;

determine columns to be included in the document based at least on the selected template, at least one of the columns comprising values aggregated from at least two of the plurality of data fields;

generate a destination list comprising the columns to be included in the document;

automatically map a subset of the plurality of data fields in the source list that have defined rules to the columns of the document in the destination list based on rules-based processing, and automatically map a subset of the plurality of data fields from the source list that do not have the defined rules to the columns in the destination list using one or more of a historical lookup processing and similarity scoring wherein the automatic mapping for the subset of data fields that do not have the defined rules causes the processor to:

access historical mapping data comprising prior mappings of the plurality of data fields to the columns;

determine if a match from the prior mappings exists in the historical mapping data for at least one data field of the subset data fields that do not have the defined rules to be included in the document; and use a mapping from the historical mapping data for the at least one data field if the match exists;

for each of the data fields from the subset of the plurality of data fields that do not have the defined rules and wherein no match exists in the historical mapping data, estimate a plurality of similarity scores for the prior mappings in the historical mapping data;

select a mapping from the historical mapping data corresponding to a highest similarity score from the plurality of similarity scores to be used for each of the data fields;

generate the document by using one or more of the automatic mappings and the selected template; and transmit the document to user-selected recipients via a delivery mode specified in the attributes.

13. The non-transitory computer readable storage medium of claim 12, wherein the instructions to automatically map the data fields further comprising instructions that cause a processor to:

estimate the plurality of similarity scores using Levenshtein edit distance method, Jaccard similarity coefficient, Jaro-Winkler distance and longest common sequence for the prior mappings in the historical mapping data for each data field-column combination where no match exists in the historical mapping data; and store the selected mapping in the historical mapping data.

14. The non-transitory computer readable storage medium of claim 12, wherein the instructions to transmit the document to user-selected recipients further comprising instructions that cause a processor to:

store the document at a server location specified in user instructions; and transmit a link to the server location to the user-selected recipients.

15. The non-transitory computer readable storage medium of claim 12, wherein the instructions to automatically map the data fields further comprising instructions that cause a processor to:

train a classifier explicitly with historical mapping data; and employ the trained classifier for automatically mapping the data fields.

* * * * *